(12) United States Patent
Kim

(10) Patent No.: US 11,673,527 B2
(45) Date of Patent: Jun. 13, 2023

(54) AIRBAG FOR VEHICLE

(71) Applicants: HYUNDAI MOTOR COMPANY, Seoul (KR); KIA CORPORATION, Seoul (KR)

(72) Inventor: Hong Gyu Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/362,583

(22) Filed: Jun. 29, 2021

(65) Prior Publication Data
US 2022/0185221 A1  Jun. 16, 2022

(30) Foreign Application Priority Data
Dec. 16, 2020 (KR) .................. 10-2020-0175951

(51) Int. Cl.
*B60R 21/239* (2006.01)
*B60R 21/2338* (2011.01)
*B60R 21/231* (2011.01)
*B60R 21/26* (2011.01)

(52) U.S. Cl.
CPC ........ *B60R 21/239* (2013.01); *B60R 21/2338* (2013.01); *B60R 21/23138* (2013.01); *B60R 2021/2395* (2013.01); *B60R 2021/23386* (2013.01); *B60R 2021/26094* (2013.01)

(58) Field of Classification Search
CPC ............ B60R 21/239; B60R 21/23138; B60R 21/2338; B60R 2021/23382; B60R 2021/2395; B60R 2021/26094; B60R 2021/23386
See application file for complete search history.

(56) References Cited

U.S. PATENT DOCUMENTS

| | | | | |
|---|---|---|---|---|
| 5,924,721 A * | 7/1999 | Nakamura | ........ | B60R 21/23138 280/730.2 |
| 5,927,750 A * | 7/1999 | Nakamura | .......... | B60R 21/2342 280/730.2 |
| 6,142,517 A * | 11/2000 | Nakamura | ........ | B60R 21/23138 280/739 |
| 6,945,559 B2 * | 9/2005 | Kassman | ............... | B60R 21/239 280/739 |
| 7,237,802 B2 * | 7/2007 | Rose | ...................... | B60R 21/239 280/743.1 |
| 7,597,355 B2 * | 10/2009 | Williams | ............ | B60R 21/2338 280/739 |
| 7,607,690 B2 * | 10/2009 | Abe | ....................... | B60R 21/239 280/739 |

(Continued)

FOREIGN PATENT DOCUMENTS

GB  2302845 A *  2/1997  ......... B60R 21/2338

*Primary Examiner* — James M Dolak
*Assistant Examiner* — Joselynn Y Sliteris
(74) *Attorney, Agent, or Firm* — Morgan, Lewis & Bockius LLP

(57) ABSTRACT

An airbag for a vehicle is proposed. The airbag includes an inflator configured to generate gas, the airbag cushion connected to the inflator and configured to expand by the gas, and a variable vent provided in a first side of the airbag cushion and configured to control opening and closing state of a vent hole of the variable vent for gas escape from the airbag cushion in response to an operational condition of the airbag cushion.

11 Claims, 5 Drawing Sheets

(56) References Cited

U.S. PATENT DOCUMENTS

| | | | | |
|---|---|---|---|---|
| 8,075,018 B2* | 12/2011 | Sugimoto | B60R 21/237 | |
| | | | 280/743.1 | |
| 8,297,651 B2* | 10/2012 | Kwon | B60R 21/231 | |
| | | | 180/274 | |
| 8,398,116 B2* | 3/2013 | Onda | B60R 21/2338 | |
| | | | 280/743.1 | |
| 9,039,037 B2* | 5/2015 | Fukushima | B60R 21/2346 | |
| | | | 280/730.2 | |
| 9,393,927 B2* | 7/2016 | Kim | B60R 21/239 | |
| 9,403,504 B2* | 8/2016 | Umehara | B60R 21/239 | |
| 9,457,759 B2* | 10/2016 | Sugimoto | B60R 21/233 | |
| 10,493,947 B2* | 12/2019 | Abele | B60R 21/231 | |
| 10,543,805 B2* | 1/2020 | Hiraiwa | B60R 21/23138 | |
| 10,814,826 B2* | 10/2020 | Baba | B60R 21/239 | |
| 10,981,533 B2* | 4/2021 | Kobayashi | B60R 21/23138 | |
| 2019/0111884 A1* | 4/2019 | Kobayashi | B60R 21/2338 | |
| 2021/0086717 A1* | 3/2021 | Jang | B60R 21/239 | |

* cited by examiner

AIRBAG FOR VEHICLE

CROSS-REFERENCE TO RELATED APPLICATION

The present application claims priority to and the benefit of Korean Patent Application No. 10-2020-0175951, filed Dec. 16, 2020, the entire contents of which is incorporated herein for all purposes by this reference.

TECHNICAL FIELD

The present disclosure relates generally to an airbag for a vehicle and, more particularly, to a vehicle airbag capable of protecting an occupant by a variable vent that may control the internal pressure of an airbag cushion in response to an operational condition of the airbag cushion after an impact occurs.

BACKGROUND

In general, as a safety device for protecting an occupant, a vehicle has an airbag with an airbag cushion that receives air generated from an inflator to be inflated during an impact. This airbag is installed in each portion of the vehicle as needed.

For example, a driver airbag (DAB) is mounted on a steering wheel to protect a driver sitting in a driver seat, a passenger airbag (PAB) is mounted on a crash pad and the like at an upper side of a glove box to protect a passenger sitting in a passenger seat, a curtain airbag (CAB) is mounted along a roof rail to protect the side of an occupant, and a knee airbag (KAB) is mounted to protect the knee of the driver or occupant.

In addition, the airbag may be classified into a front airbag installed in front of the driver or occupant in the vehicle and a side airbag installed in a door surface or the like at the side of the driver or occupant.

Each airbag commonly includes, as main components, an inflator configured to generate gas and an airbag cushion connected to the inflator and deployed by the gas flowing from the inflator to protect the occupant.

Furthermore, the airbag cushion has a vent including a hole provided for gas to escape. That is, in order to prevent the occupant sitting in a seat from being injured due to the airbag cushion rapidly being inflated and deployed, the vent is provided in the airbag cushion so that the gas escapes from the airbag cushion and airbag cushion does not excessively press the occupant.

For example, a conventional SAB has a vent having a flow path of a certain size, and a certain amount of gas continuously escapes from the airbag cushion through the flow path. Therefore, the airbag cushion may function as a cushion to protect the occupant without causing injuries.

However, the conventional SAB having the vent with the flow path of the certain size allows gas to continuously escape through the vent after the deployment starts, so that the internal pressure of the airbag cushion cannot be controlled fluidly in response to crash situations.

That is, during deployment of the airbag cushion after a crash, the airbag cushion should be rapidly deployed with maintaining the internal pressure. However, in the conventional airbag, during the deployment of the airbag cushion, a certain amount of gas continuously escapes from the vent, so unnecessary loss of the internal pressure can occur.

In particular, until the airbag cushion reaches its full inflation, a certain level of pressure or higher should be applied inside the airbag cushion to enable rapid deployment of the airbag cushion. However, in this case, since gas continuously escapes from the airbag cushion after the deployment starts, the airbag cushion cannot be rapidly deployed due to the loss of internal pressure.

In addition, even though the internal pressure of the airbag cushion is not high after a crash, gas continuously escapes from the airbag cushion through an external vent so that the internal pressure can be excessively reduced. When the passenger load is applied to the airbag cushion after gas generation in the inflator is completed, the airbag cushion cannot function properly as a cushion due to little internal pressure, so the occupant can be injured by hitting a hard vehicle surface due to the airbag cushion having little internal pressure and not sufficiently buffering impact between the occupant and the vehicle body in the case of an impact.

The foregoing is intended merely to aid in the understanding of the background of the present disclosure, and is not intended to mean that the present disclosure falls within the purview of the related art that is already known to those skilled in the art.

SUMMARY

The present disclosure provides an airbag for a vehicle, wherein a variable vent is provided in the airbag to protect an occupant, the variable vent being configured to control the internal pressure of an airbag cushion in response to an operational condition of the airbag cushion after an impact occurs.

The present disclosure is not limited to the objective mentioned above, and other objectives not mentioned are clearly understood by those who are ordinarily skilled in the art to which the present disclosure belongs (hereinbelow, referred to 'those skilled in the art') from the following description.

In order to achieve the above object, according to one aspect of the present disclosure, there is provided an airbag for a vehicle, the airbag including: an inflator configured to generate gas; and an airbag cushion connected to the inflator and configured to expand to be deployed by the gas injected from the inflator, wherein a variable vent may be provided in a first side of the airbag cushion, the variable vent being configured such that opening and closing state of a vent hole of the variable vent may be controlled for gas escape from the airbag cushion in response to an operational condition of the airbag cushion.

The variable vent may include: the vent hole formed on the airbag cushion; a panel configured to normally close the vent hole while being removably attached to a portion around the vent hole of the airbag cushion; and a tether having a predetermined length, the tether connecting the panel to the portion around the vent hole of the airbag cushion.

The removable attachment between the panel and the airbag cushion may be configured such that when a force above a predetermined level is applied to removably attached portions of the panel and the airbag cushion, the removably attached portions may be separated from each other.

When the airbag cushion is fully deployed, the attached portions of the panel and the airbag cushion may be separated from each other so that the panel may open the vent hole.

When internal pressure of the airbag cushion is reduced to a predetermined level due to the gas escape through the vent hole after full deployment of the airbag cushion, the panel may close the vent hole by being brought into close contact with the airbag cushion due to the tether connected to the portion of the airbag cushion.

The tether may include: left and right tethers connecting left and right portions of the panel to portions at left and right sides around the vent hole of the airbag cushion, respectively; and an upper tether connecting an upper portion of the panel to an upper portion around the vent hole of the airbag cushion.

The tether may be made of a material having elasticity.

A normally open vent may be provided on a second side of the airbag cushion, the normally open vent being configured such that a vent hole thereof may be normally open for the gas escape from the airbag cushion.

The normally open vent may be configured such that the gas may escape by a flow amount smaller than a flow amount of the variable vent.

The airbag may be provided in a vehicle as a side airbag comprising the inflator and the airbag cushion.

The variable vent may be positioned at a middle height in a vertical direction of the airbag cushion of the side airbag, and the normally open vent may be positioned at an upper portion of the airbag cushion of the side airbag.

Accordingly, the airbag for a vehicle according to the present disclosure includes the variable vent capable of controlling the internal pressure of the airbag cushion in response to an operational condition of the airbag cushion after an impact occurs, so that the safety of the occupant can be secured.

During deployment of the airbag cushion, the vent hole is closed so that gas does not escape from the variable vent. Accordingly, the internal pressure loss of the airbag cushion can be minimized, rapid deployment of the airbag cushion can be realized, and deployment performance of the airbag cushion can be improved.

During full deployment of the airbag cushion, the vent hole is opened and gas escapes from the variable vent, so that the occupant can be prevented from being injured by hitting the airbag cushion.

After full deployment of the airbag cushion, the variable vent is closed again to prevent complete loss of the internal pressure of the airbag cushion. Therefore, the hard contact between the occupant and the vehicle body after gas completely escapes from the airbag cushion can be prevented, and injuries to the occupant due to the hard contact can be prevented.

DRAWINGS

The above and other objectives, features, and other advantages of the present disclosure will be more clearly understood from the following detailed description when taken in conjunction with the accompanying drawings, in which.

DETAILED DESCRIPTION

Figure 1:
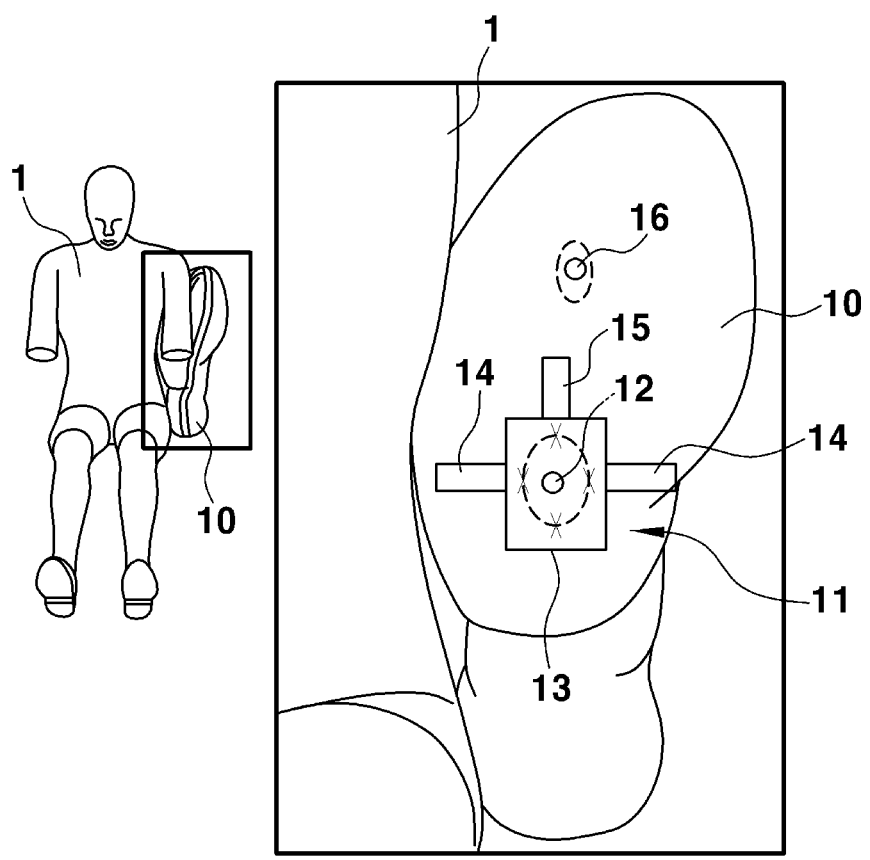
FIGS. 1 and 2 are views showing installation of a normally open vent and a variable vent of an airbag for a vehicle in one form of the present disclosure.

In the following description, the structural or functional description specified to an exemplary form of the present disclosure is intended to describe the exemplary form, and a form may be changed in various ways and various shapes. However, it should be understood that exemplary forms the present disclosure are not limited to the form which will be described hereinbelow with reference to the accompanying drawings, but all of modifications, equivalents, and substitutions are included in the scope and spirit of the disclosure.

It will be understood that although the terms first and/or second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

Like reference numerals are used to identify like components throughout different drawings. The terminology used herein is for the purpose of describing a particular form only and is not intended to limit the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinbelow, some forms of the present disclosure will be described in detail with reference to the accompanying drawings.

The present disclosure provides an airbag for a vehicle (hereinbelow, which will refer to as "vehicle airbag"), wherein a variable vent is provided, the variable vent being configured to control the internal pressure of an airbag cushion in response to an operational condition of the airbag cushion after a crash even, so that the safety of an occupant may be more effectively secured.

In order to prevent injuries to the occupant by hitting the airbag cushion, a vent configured to open a flow path only when the airbag cushion is fully deployed after an impact may be enabled, and thus the internal pressure of the airbag cushion may be reduced to protect the occupant.

However, with the vent configured to open the flow path only when the airbag cushion is fully deployed, the internal pressure of the airbag cushion may not be controlled in response to the time and situation after the impact. With a normal vent structure, the airbag cushion does not function as a cushion at the point when the occupant needs to be protected.

That is, since gas continuously escapes from the airbag cushion even after the airbag cushion is fully deployed, the internal pressure of the airbag cushion may be rapidly reduced after full deployment of the airbag cushion. Furthermore, the internal pressure of the airbag cushion may completely escape, and thus the airbag cushion does not function as a cushion. When the gas continuously escapes even after the airbag cushion is fully deployed, a large amount of gas rapidly escapes from the airbag cushion by an occupant load applied to the airbag cushion, so the internal pressure of the airbag cushion is easily reduced.

Therefore, the occupant may suffer the hard contact with the vehicle body due to the airbag cushion that is completely deflated. At this time, the occupant may be seriously injured due to the airbag cushion that does not function as a cushion.

Accordingly, proper gas escape and internal pressure control of the airbag cushion should be performed in the entire process of the impact as an opening and closing state of the vent is properly controlled by subdividing the airbag operation step by step.

For example, during deployment of the airbag cushion after an impact, the flow path of the vent should be closed for rapid deployment of the airbag cushion and to maintain of the internal pressure of the airbag cushion, thereby inducing rapid deployment of the airbag cushion (improving the airbag deployment performance).

On the other hand, when the airbag is fully deployed and the occupant is brought into contact with the airbag cushion, the gas should escape while the flow path of the vent is opened, so that the occupant is not injured due to the airbag cushion reaching the full deployment. That is, as the internal pressure of the airbag cushion is configured to be reduced, the occupant may be protected.

Furthermore, when the internal pressure of the airbag cushion is reduced below a predetermined level after the airbag cushion is fully deployed and gas escape starts, the flow path of the vent should be closed again. Therefore, complete loss of the internal pressure of the airbag cushion may be prevented, and as the occupant may be protected by the airbag cushion, injuries to the occupant by hitting the hard vehicle body may be prevented.

For the above objectives, a vehicle airbag with a new type of a variable vent capable of controlling gas escape from the airbag cushion in response to an operational condition of the airbag cushion is disclosed.

Figure 2:
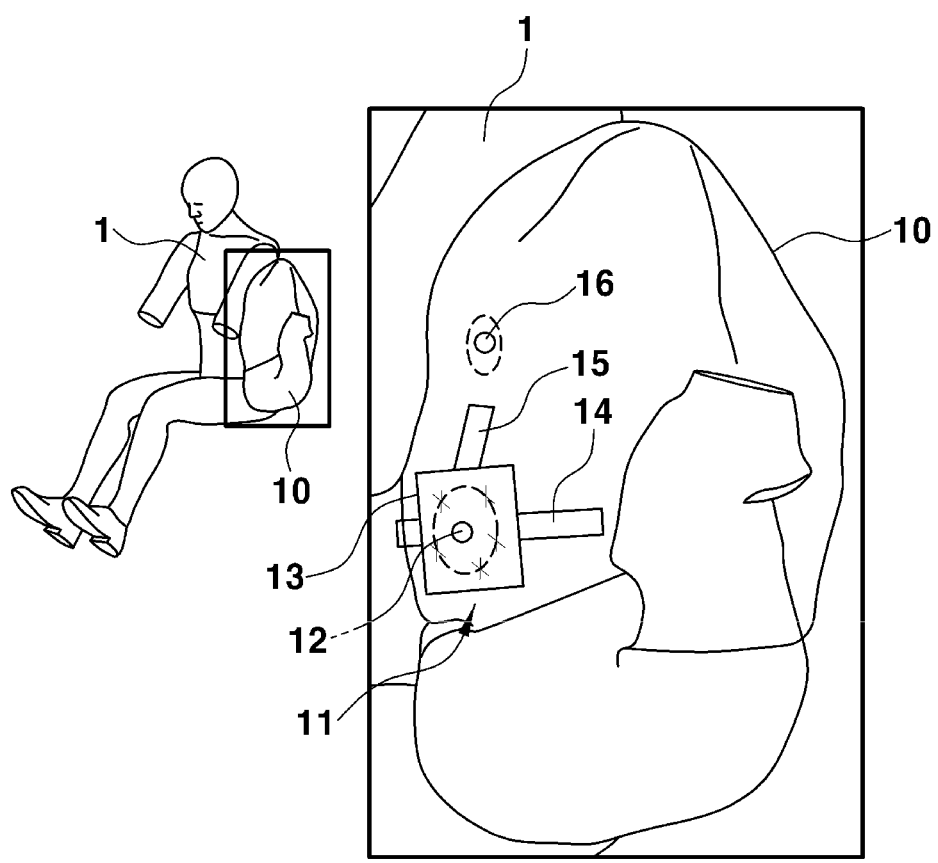

FIGS. 1 and 2 are views showing installation of a normally open vent and a variable vent of a vehicle airbag in some forms of the present disclosure. As shown in the drawings, the vehicle airbag in some forms of the present disclosure may be a side airbag.

In FIGS. 1 and 2, an airbag cushion 10 is shown as a state of expanding to a predetermined level so that the variable vent 11 and the normally open vent 16 of the airbag cushion 10 of the side airbag are visible. In FIGS. 1 and 2, the airbag is shown with a vent hole 12 of the variable vent 11 in a closed state after an impact occurs and the airbag cushion 10 starts to be deployed before the vent hole is opened.

FIG. 1 is a front view showing the airbag cushion taken in a direction from the front to the rear of the airbag cushion, and FIG. 2 is a view showing the airbag cushion taken at a position between the front and the side of the airbag cushion in an obliquely direction. In FIG. 1, reference numeral 1 is a dummy that is a driver or an occupant seated in a vehicle seat.

The vehicle airbag in some forms of the present disclosure includes an inflator (not shown) configured to generate gas, and the airbag cushion 10 connected to the inflator and deployed when the gas is injected from the inflator to protect an occupant.

Furthermore, the variable vent 11 of the airbag cushion 10 is applied to the vehicle airbag in some forms of the present disclosure. That is, the variable vent 11 is provided at a first side of the airbag cushion 10, and the variable vent 11 has the vent hole 12 in which an opening and closing state and an open late thereof are controlled. In addition, in the vehicle airbag in some forms of the present disclosure, the normally open vent 16 in which a flow path (vent hole) is normally open may be provided on a second side of the airbag cushion 10.

As shown in some forms of the present disclosure, the variable vent 11 may be installed to be positioned at a middle height in a vertical direction of the airbag cushion 10 of the side airbag, and the normally open vent 16 may be installed to be positioned at an upper portion of the airbag cushion 10.

In the normally open vent 16, the normally open structure thereof is not different from the structure of an external vent of the conventional airbag. However, in some forms of the present disclosure, the normally open vent 16 only needs to assist a venting action of the variable vent 11, so that the normally open vent 16 may have a flow path of a smaller size than a size of a flow path of the external vent of the conventional airbag. Furthermore, the size of the flow path of the normally open vent 16 may be smaller than a size of a flow path of the variable vent 11 in a fully open state.

As described above, in the vehicle airbag in some forms of the present disclosure, a variable dual vent may be used as an external vent installed in the airbag cushion 10 and allowing gas to escape, the variable dual vent including the large variable vent 11 through which the large flow of gas may escape and the small normally open vent 16 through which the flow of gas smaller than the flow of gas of the variable vent 11 may escape. For the above structure, the vent hole of the variable vent 11 may have a gas-passing sectional area larger than an area of a vent hole of the normally open vent 16.

In some forms of the present disclosure, in the variable vent 11, a panel 13 normally closes the vent hole 12 while being removably attached to a portion around the vent hole 12 of the airbag cushion 10 from after start of deployment of the airbag cushion 10 to before full deployment. Then, when the airbag cushion 10 is fully deployed, the internal pressure of the airbag cushion 10 is increased above a predetermined level, so that attachment portions between the panel 13 and the airbag cushion 10 are separated from each other. As described above, when the panel 13 is separated from the airbag cushion 10, the vent hole 12 is opened, and then, when the volume of the airbag cushion 10 is reduced, the panel 13 is attached to the airbag cushion again to close the vent hole 12.

In detail, in the vehicle airbag in some forms of the present disclosure, the variable vent 11 includes: the vent hole 12 formed on the first side of the airbag cushion 10 and escaping gas in the airbag cushion; the panel 13 removably attached and locked to the portion around the vent hole 12 of the airbag cushion while normally closing the vent hole 12; and a tether 14, 15 having a predetermined length, and connecting the panel 13 to the portion around the vent hole 12 of the airbag cushion.

Herein, the panel 13 is removably attached to the airbag cushion 10 to maintain a closed state of the vent hole 12. As shown in the drawings, the quadrilateral panel 13 may be used to close the circular vent hole 12 provided on the airbag cushion 10. In addition, the panel 13 may be made of a material that is stretchable in all direction.

In some forms of the present disclosure, removable attachment between the panel 13 and the portion around the vent hole 12 of the airbag cushion 10 may be performed at a plurality of positions. The panel 13 and the portion of the airbag cushion 10 are removably attached so that the panel is separated from the portion of the airbag cushion only when a predetermined level of load is applied to the panel.

In addition, during removable attachment, both the portions may be removably attached by bonding with an adhesive, sewing with a thread, or bonding with tape. In the present disclosure, the state in which the panel 13 is removably attached to the portion around the vent hole 12 of the airbag cushion 10 means that the attached portions are temporarily attached and means an attachment state in which both the portions may be separated from each other by a force above the predetermined level.

In some forms of the present disclosure, when the panel 13 is removably attached to the airbag cushion 10 to close the vent hole 12, and when the airbag cushion expands to enter a state of internal pressure above a predetermined level, the panel 13 removably attached to the portion of the airbag cushion is detached and separated therefrom, and the vent hole 12 is opened.

The tether 14, 15 may be made of a length member having a predetermined length, the length member having a long and thin shape while having a predetermined width. The tether 14, 15 is installed with a first end thereof is fixed to the airbag cushion 10 and a second end thereof is fixed to the panel 13.

In some forms of the present disclosure, a plurality of tethers 14 and 15 may be connected to the panel 13 and the airbag cushion 10. The tethers 14 and 15 may include both left and right tethers 14 installed to respectively connect left and right portions of the panel 13 to left and right portions around the vent hole 12 of the airbag cushion 10. In addition, the tethers 14 and 15 may include an upper tether 15 connecting an upper portion of the panel 13 to an upper portion around the vent hole 12 of the airbag cushion 10.

In some forms of the present disclosure, each of the tethers 14 and 15 may be made of a material having elasticity. Each tether 14, 15 connects and supports the panel 13 to and on the airbag cushion 10. Therefore, when the removable attachment of the panel is released and the panel 13 is separated from the airbag cushion 10, the panel 13 is completely deviated from the airbag cushion 10 and maintains a separated state from the airbag cushion 10 only enough to open the vent hole 12.

Figure 3:
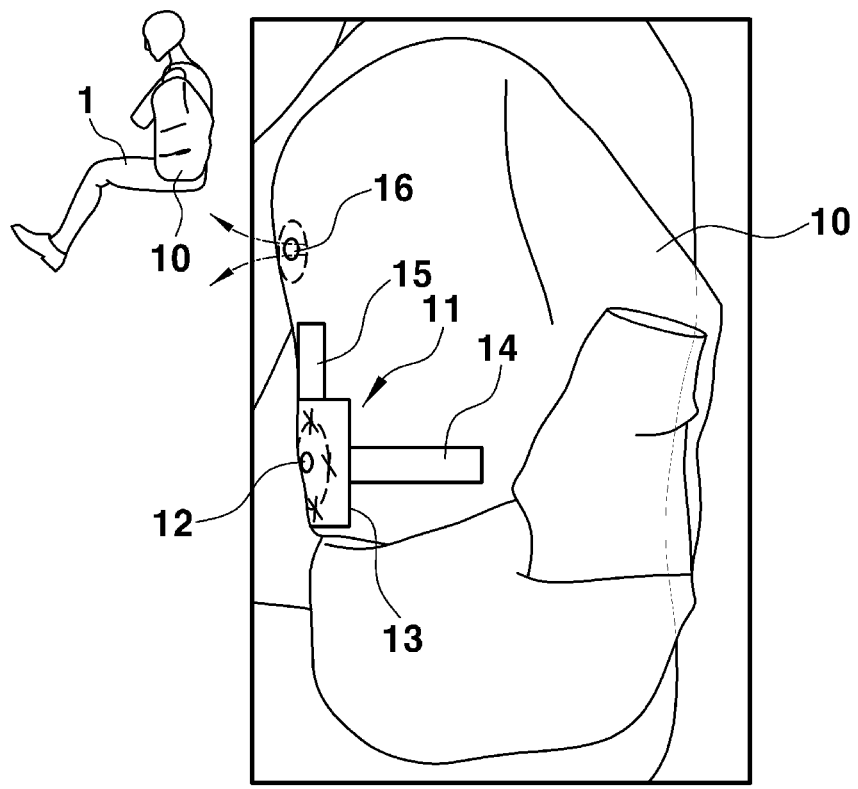
FIGS. 3 to 5 are views showing a variable dual vent operated in response to operational conditions of an airbag cushion of the airbag for a vehicle in one form of the present disclosure.
Figure 4:
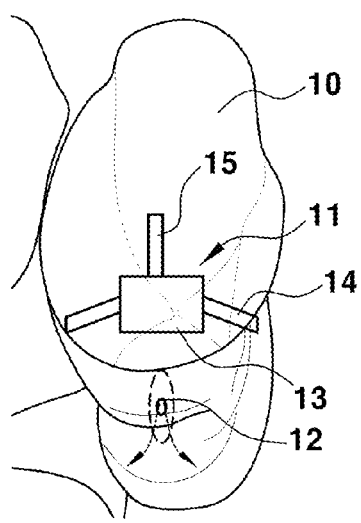
Figure 5:
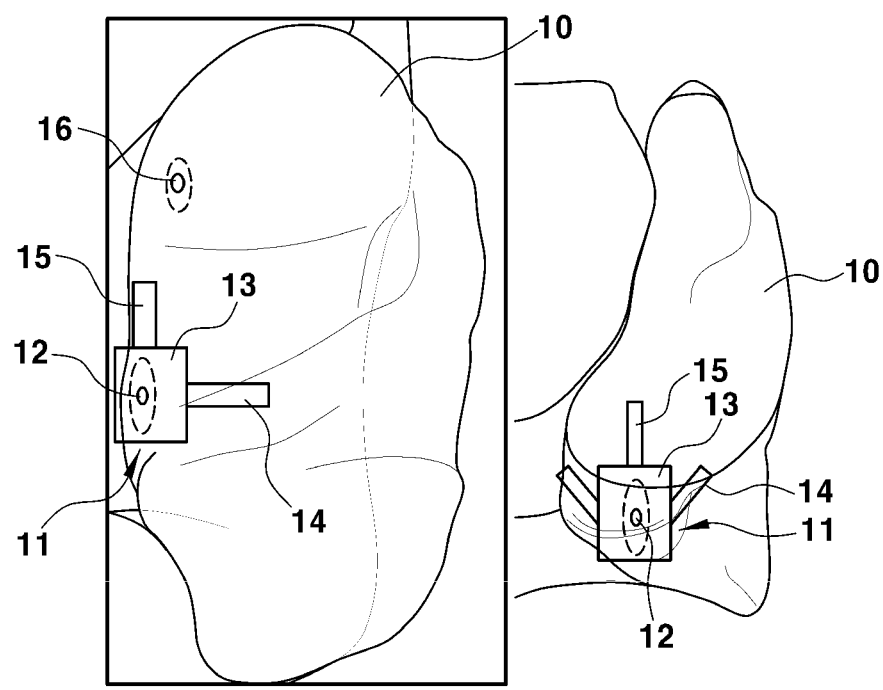

FIGS. 3 to 5 are views showing the variable dual vent operated in response to an operational condition of an airbag cushion of the vehicle airbag in some forms of the present disclosure. FIG. 3 is a view showing the airbag cushion 10 before full deployment, FIG. 4 is a view showing the airbag cushion 10 in full deployment, and FIG. 5 is a view showing the airbag cushion 10 with reduced volume after full deployment of the airbag cushion.

Referring to FIG. 3, after an impact, from a point when the airbag cushion 10 starts to be deployed to a point before the airbag cushion is fully deployed, the panel 13 of the variable vent 11 maintain a coupled state to the airbag cushion while being removably attached to the portion around the vent hole 12 of the airbag cushion, and the vent hole 12 maintains a closed state by the removably attached panel 13.

As described above, when the airbag cushion 10 is deployed in the closed state of the variable vent 11, the gas in the airbag cushion 10 escapes only through the normally open vent 16 of a small size. Accordingly, rapid deployment of the airbag cushion may be induced as the internal pressure escape of the airbag cushion 10 is minimized.

Then, when the airbag cushion 10 is fully deployed, the panel 13 expands toward opposite sides thereof due to the internal pressure of the airbag cushion 10, and the removably attached portions of the panel 13 on the airbag cushion 10 are separated from the airbag cushion 10. Therefore, the removable attachment of the panel 13 is entirely released, so that the panel 13 is separated from the airbag cushion 10 and tension is applied to the tethers 14 and 15. In addition, both the left and right tethers 14 are elongated due to tension, and the panel 13 is turned over due to the rotation of the upper tether 15 and the vent hole 12 covered by the panel 13 is exposed and opened.

The gas in the airbag cushion escapes through both the variable vent 11 and the normally open vent 16, so that the internal pressure of the airbag cushion 10 is reduced. Accordingly, even when the occupant is brought into contact with the rapidly inflated airbag cushion, the occupant may be protected, and injuries to the occupant by hitting between the inflated airbag cushion and the occupant may be prevented.

In addition, when the collision progresses further and the internal pressure of the airbag cushion 10 is reduced, the panel 13 and the airbag cushion 10 are brought closer together again, and the panel 13 is brought into contact with the portion around the vent hole 12 of the airbag cushion. Therefore, tension applied to both the left and right tethers 14 are also reduced, and the panel 13 blocks the vent hole 12 again while being brought into contact with the portion around the vent hole 12 of the airbag cushion. Accordingly, the gas does not escape through the variable vent 11, and a small amount of gas may escape only through the normally open vent 16.

As described above, when the small amount of gas escapes only through the normally open vent 16, rapid loss of the internal pressure of the airbag cushion 10 may be prevented. Eventually, it is possible to prevent the hard contact (which is caused when the internal pressure of the airbag cushion 10 is completely exhausted at a final stage of the impact), that is, it is possible to prevent contacting between the occupant and the vehicle body when the airbag cushion from which the gas completely escapes does not function as a cushion, so the occupant may be securely protected from an impact.

Figure 6:
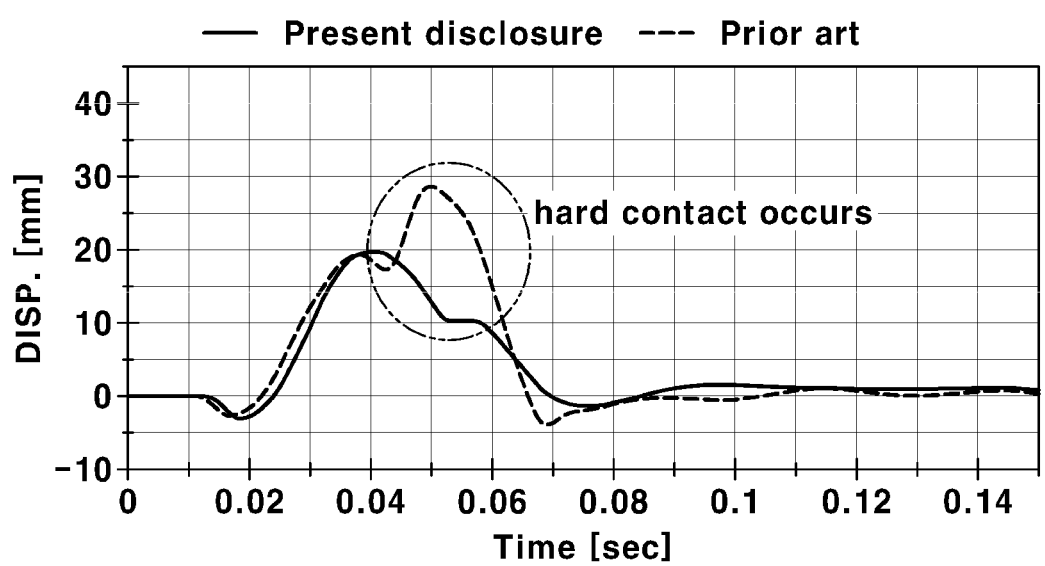
FIGS. 6 and 7 are views showing that the conventional problem of the hard contact may be overcome in the airbag for a vehicle in one form of the present disclosure.
Figure 7:
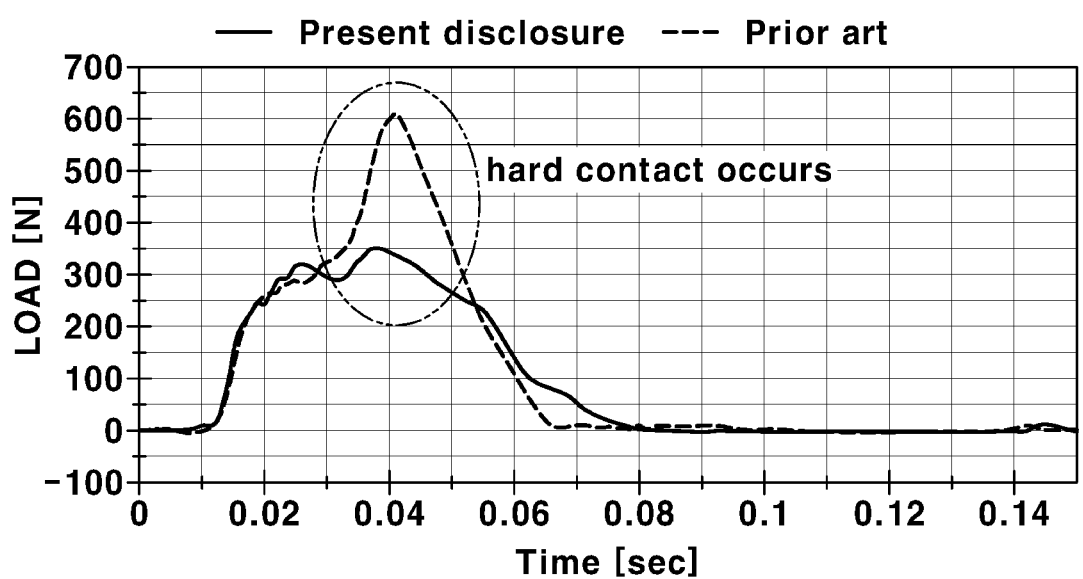

FIGS. 6 and 7 are views showing that the conventional problem of the hard contact may be overcome in the vehicle airbag in some forms of the present disclosure.

In FIG. 6, a vertical axis (Y axis) represents the change in chest displacement of the occupant (dummy) after an impact, and in FIG. 7, a vertical axis (Y axis) represents the change in abdominal load after an impact.

In the vehicle airbag in some forms of the present disclosure, since the variable vent 11 is closed until the full deployment of the airbag cushion 10, the internal pressure loss of the airbag cushion during the deployment process may be minimized. Therefore, since the internal pressure loss of the airbag cushion 10 is reduced compared to the conventional airbag, the rapid deployment of the airbag cushion at the start of the collision is possible.

When the airbag cushion 10 is fully deployed, the gas may escape from the airbag cushion as the variable vent 11 is opened, and thus the internal pressure of the airbag cushion may be reduced to an appropriate level. As described above, at the point of the full deployment, as the internal pressure of the airbag cushion is reduced, injuries to the occupant due to rapid inflation of the airbag cushion may be prevented, and the occupant may be protected.

In addition, after the full deployment of the air bag cushion, when the variable vent 11 is opened and the volume and the internal pressure of the airbag cushion 10 is reduced to the predetermined level, the variable vent 11 is closed again and the gas does not escape from the airbag cushion 10, and then the internal pressure loss of the airbag cushion may be minimized. Eventually, as the variable vent 11 is closed, complete loss of the internal pressure of the airbag cushion 10 may be prevented, and the hard contact between the occupant and the vehicle body and injuries to the occupant due to the airbag cushion 10 in the complete loss of the internal pressure may be prevented.

Referring to FIGS. 6 and 7, in the conventional airbag, the hard contact occurs at both the chest and abdomen due to the internal pressure loss of the airbag cushion is generated at the middle section and late section of the impact. However, in the airbag in some forms of the present disclosure, the hard contact caused when the middle and late sections may be significantly improved.

Although the preferred form of the present disclosure has been described for illustrative purposes, those skilled in the art will appreciate that various modifications, additions and substitutions are possible, without departing from the scope and spirit of the present disclosure as disclosed in the accompanying claims.

What is claimed is:

1. An airbag for a vehicle, the airbag comprising:
an airbag cushion being expandable in volume by a supplied gas thereto; and
a variable vent provided in a first side of the airbag cushion and configured to control opening and closing state of a vent hole of the variable vent for gas escape from the airbag cushion in response to an operational condition of the airbag cushion,
wherein the variable vent comprises:
the vent hole formed on the airbag cushion;
a panel configured to normally close the vent hole while being removably attached to a portion around the vent hole on an outer surface of the airbag cushion, wherein the panel is fully detachable from the outer surface of the airbag cushion; and
a tether having a predetermined length, the tether connecting the panel to the portion around the vent hole, wherein a first end of the tether is coupled to the outer surface of the airbag cushion and a second end of the tether is coupled to the panel.

2. The airbag of claim 1, wherein the variable vent further comprises:
a removable attachment provided between the panel and the airbag cushion,
wherein the removable attachment is separated when a force greater than a predetermined level is applied.

3. The airbag of claim 2, wherein the removable attachment is separated such that the panel opens the vent hole when the airbag cushion is fully deployed.

4. The airbag of claim 3, wherein the panel is configured to:
when internal pressure of the airbag cushion is reduced to a predetermined level due to the gas escape through the vent hole after full deployment of the airbag cushion, close the vent hole by the tether connected to the portion of the airbag cushion.

5. The airbag of claim 1, wherein the tether further comprises:
a left tether configured to connect a left portion of the panel to a left portion around the vent hole;
a right tether configured to connect a right portion of the panel to a right portion around the vent hole; and
an upper tether configured to connect an upper portion of the panel to an upper portion around the vent hole.

6. The airbag of claim 1, wherein the tether is made of a material having elasticity.

7. The airbag of claim 1, further comprising:
a normally open vent provided on a second side of the airbag cushion, wherein the normally open vent is configured to open a vent hole of the normally open vent for the gas escape from the airbag cushion.

8. The airbag of claim 7, wherein the normally open vent is configured to:
open the vent hole of the normally open vent for the gas escape from the airbag cushion when the gas escapes by a flow amount less than a flow amount of the variable vent.

9. The airbag of claim 7, wherein the airbag is provided in a vehicle as a side airbag.

10. The airbag of claim 9, wherein:
the variable vent is provided at a middle height in a vertical direction of the airbag cushion of the side airbag, and
the normally open vent is provided at an upper portion of the airbag cushion of the side airbag.

11. The airbag of claim 1, wherein the panel is configured to:
when internal pressure of the airbag cushion is reduced to a predetermined level due to the gas escape through the vent hole after full deployment of the airbag cushion, close the vent hole by the tether connected to the portion of the airbag cushion.

* * * * *